US009817150B2

(12) United States Patent
Sossong (10) Patent No.: US 9,817,150 B2
(45) Date of Patent: Nov. 14, 2017

(54) ACTIVE CHARGED PARTICLE TOMOGRAPHY (71) Applicant: Decision Sciences International Corporation, Poway, CA (US)

(72) Inventor: Michael James Sossong, Ramona, CA (US)

(73) Assignee: Decision Sciences International Corporation, Poway, CA (US)

( * ) Notice: Subject to any disclaimer, the term of this patent is extended or adjusted under 35 U.S.C. 154(b) by 0 days.

(21) Appl. No.: 15/060,414

(22) Filed: Mar. 3, 2016

(65) Prior Publication Data

US 2016/0260578 A1 Sep. 8, 2016

Related U.S. Application Data (60) Provisional application No. 62/128,479, filed on Mar. 4, 2015.

(51) Int. Cl.
*G01V 5/00* (2006.01)

(52) U.S. Cl.
CPC .................... *G01V 5/0016* (2013.01)

(58) Field of Classification Search
CPC ..................................................... G01V 5/0016
USPC .................................. 250/306, 307
See application file for complete search history.

(56) References Cited

U.S. PATENT DOCUMENTS 3,970,936 A * 7/1976 Arnold .................... H04B 13/00
455/112
7,335,887 B1 2/2008 Verbinski et al.
8,247,767 B2 8/2012 Morris et al.
2008/0156992 A1* 7/2008 Kang .................... G01V 5/0016
250/359.1
2009/0279664 A1* 11/2009 McNabb, Jr. ........ G01V 5/0016
378/62
2011/0127426 A1* 6/2011 Akery .................... G01N 23/04
250/306

(Continued)

FOREIGN PATENT DOCUMENTS

NO 2014/051895 A2 4/2014

OTHER PUBLICATIONS

Borozdin, K. N., et al., "Surveillance: Radiographic Imaging with Cosmic Ray Muons," Nature, 422:277-278, Mar. 2003.

(Continued)

*Primary Examiner* — Michael Maskell
(74) *Attorney, Agent, or Firm* — Perkins Coie LLP (57) ABSTRACT

An active radiation source portal monitoring system includes a particle accelerator to generate accelerated protons as a source of charged particles; a charged particles control unit to control the charged particles to enter into a volume to be scanned in a desired direction to interact with an object; a particle tracking unit to detect the charged particles exiting the volume after interacting with the object and generate signals indicative of information on the charged particles exiting the volume; and a signal processing unit communicatively coupled to the particle tracking unit. The signal processing unit can receive the generated signals and analyze scattering of the charged particles in one or more materials included in the object based on the received signals indicative of the information on the charged particles exiting the volume to obtain a tomographic profile or a spatial distribution of scattering centers within the object.

19 Claims, 8 Drawing Sheets

(56) References Cited

U.S. PATENT DOCUMENTS

| | | | |
|---|---|---|---|
| 2011/0248163 A1* | 10/2011 | Morris | G01N 23/046 |
| | | | 250/307 |
| 2012/0318993 A1 | 12/2012 | Boatner et al. | |
| 2014/0070095 A1 | 3/2014 | Schoenmakers et al. | |
| 2014/0319365 A1 | 10/2014 | Sossong et al. | |
| 2014/0339426 A1* | 11/2014 | Taleyarkhan | G01T 5/002 |
| | | | 250/335 |

OTHER PUBLICATIONS

International Search Report and Written Opinion dated May 17, 2016 for International Application No. PCT/US2016/020758, dated Mar. 3, 2016 (8 pages).

* cited by examiner

FIG. 1

| MATERIAL | dE/dx MeV-cm²/gm | X cm |
|---|---|---|
| $H_2O$ | 2.06 | 36 |
| Fe | 1.87 | 1.76 |
| Pb | 1.54 | 0.56 |

ACTIVE CHARGED PARTICLE TOMOGRAPHY

CROSS REFERENCE TO RELATED APPLICATIONS

This patent document claims the benefit of priority of U.S. Provisional Patent Application No. 62/128,479, filed on Mar. 4, 2015. The entire content of the before-mentioned patent application is incorporated by reference as part of the disclosure of this document.

TECHNICAL FIELD

This patent document relates to systems, devices, and processes that use charged particle imaging technologies.

BACKGROUND

This patent document relates to detection of cosmic radiation and imaging based on charged particles.

The use of portal monitors at border crossing points is becoming routine for detecting smuggled nuclear materials. In many cases shielding can be used to obscure a nuclear signature.

SUMMARY

Techniques, systems, and devices are disclosed for implementing an active charged particle tomographic imaging.

In one aspect, an active radiation source portal monitoring system includes a particle accelerator to generate charged particles; a target to generate other charged particles for use in imaging (e.g. protons on a target to create muons); a charged particles control unit to control the charged particles to enter into a volume to be scanned in a desired direction to interact with an object located in the volume; a particle tracking unit arranged at a location near the volume to detect the charged particles exiting the volume after interacting with the object and generate signals indicative of information on the charged particles exiting the volume; and a signal processing unit communicatively coupled to the particle tracking unit. The signal processing unit receives the generated signals and analyzes scattering of the charged particles in one or more materials included in the object based on the received signals indicative of the information on the charged particles exiting the volume to obtain a tomographic profile or a spatial distribution of scattering centers within the object.

The subject matter described in this patent document can be implemented in specific ways that provide one or more of the following features. For example, the particle tracking unit can include a set of position sensitive charged particle detectors positioned at a location with respect to the volume to measure positions and directions of the charged particles exiting from the volume. The system can include another particle tracking unit positioned at a location near the volume to detect the charged particles entering the volume. The other particle tracking unit can include another set of position sensitive charged particle detectors to measure positions and directions of the charged particles entering the volume towards the object. For creation of muons, the system can include a target unit to receive the accelerated protons. A nuclear interaction between the accelerated proton and atomic nucleus of the target unit can produce pions. The system can include a beamline unit to allow the produced pions to decay into the charged particles, and a selection unit to select the charged particles having specific values of momentum. The charged particles control unit can supply the accelerated protons directly to the volume. The system can include a filter to remove at least some of the protons that remain after the pions decay into muons. The specific values of momentum can include values between 500 MeV and 1500 MeV. The signal processing unit can be used to reconstruct a trajectory of the charged particles entering the volume and interacting with the object, measure a momentum of the charged particles exiting the volume after interacting with the object based on signals from the first set of position sensitive charged particle detectors, and obtain a spatial distribution of a scattering density of the object holding volume. The signal processing unit can determine a spatial distribution of a scattering density of the object to obtain predetermined charged particle tomography data corresponding to scattering angles and estimated momentum of the charged particles passing through the volume and interacting with the object; provide a probability distribution of charged particle scattering for use in an expectation maximization algorithm based on a statistical multiple scattering model; and determine a substantially maximum likelihood estimate of the scattering density of the object using the expectation maximization algorithm. The sets of position sensitive charged particle detectors of the particle tracking units can include a first double-layer of drift tubes arranged in an X direction and a second double-layer of drift tubes arranged in a Y direction.

In another aspect, a method for sensing a presence or absence of a material in a target object includes artificially generating charged particles as incident charged particles that are used to detect an object in a scan volume of a charged particle tomographic system; adjusting the incident charged particles to pass through the scan volume in a desired direction to interact with the object in the scan volume; detecting at a set of position sensitive charged particle detectors located on a side of the scan volume to measure positions and directions of the charged particles exiting the scan volume after interacting with the object; obtaining detector signals from the set of position sensitive charged particle detectors containing information of the charged particles exiting the scan volume; analyzing scattering of the charged particles in the object based on the positions and directions of the charged particles exiting the scan volume to obtain a tomographic profile or a spatial distribution of scattering centers within the object; and processing the tomographic profile or the spatial distribution of scattering centers to determine a presence or absence of a target material in the object.

The method can be implemented in various ways to include one or more of the following features. For example, the method can include detecting at a second set of position sensitive charged particle detectors located on a side near the scan volume containing the object to measure positions and directions of the incident charged particles entering the scan volume and traversing towards the object; and obtaining detector signals containing information of the incident charged particles entering the scan volume from the set of position sensitive charged particle detectors located on the side near the scan volume containing the object to measure positions and directions of the incident charged particles entering the scan volume. The analyzing can include using the positions and directions of the incident charged particles entering the scan volume to obtain the tomographic profile or the spatial distribution of scattering centers within the object. The method can include utilizing information on the incident charged particles that are determined during the adjusting operation as information of the incident charged particles entering the scan volume. The analyzing can include using the positions and directions of the incoming charged particles obtained from the adjusting to obtain the tomographic profile or the spatial distribution of scattering centers within the object. The artificially generating of the produced charged particles can include generating accelerated protons; directing the generated protons toward a target to produce pions; and decaying the produced pions into charged particles that are supplied as the incident charged particles. The analyzing the scattering of the charged particles in the object can include obtaining an angle and momentum of each charged particle passing through the object to provide a probability distribution of charged particle scattering. The method can include determining a type of the target material present in the object. The determining the type of the target material can be based at least partly on atomic numbers of the target material. The method can include removing at least some of the protons that remain after the charged particles are produced.

DETAILED DESCRIPTION

In this document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Examples of implementations of the disclosed technology includes an active radiation source-based charged particle tomographic system.

Figure 1:
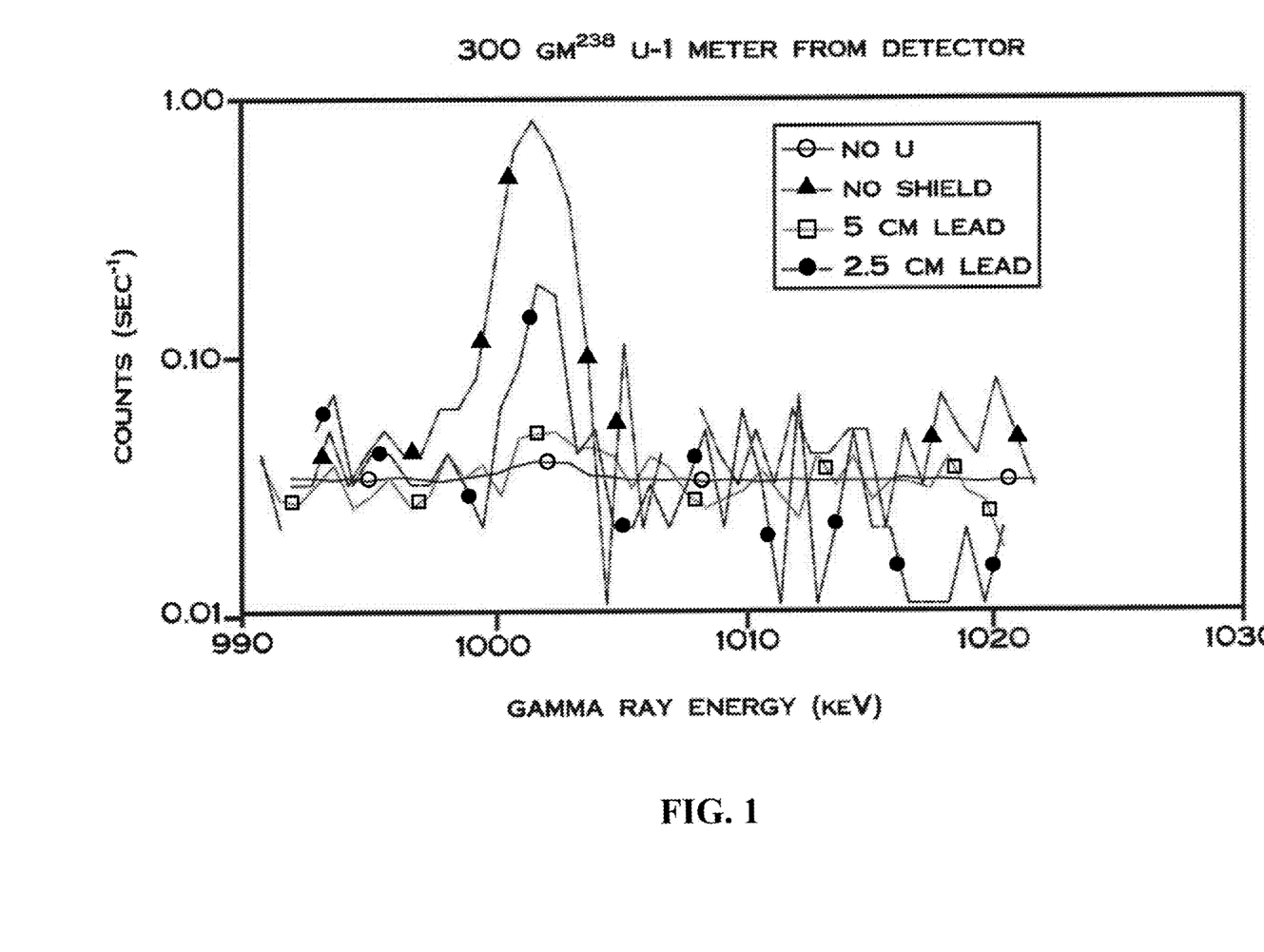
FIG. 1 illustrates example count data from a high resolution gamma ray detector used to detect Weapon grade uranium (WGU): 10% 238U 90% 235U, using the gamma-ray signal from a 400 gm sample of 238U, without shielding and with 5 cm and 2.5 cm of lead shielding, respectively.

Nuclear material detectors that use high resolution gamma or X ray detectors may not be effective in detecting even a small amount of material needed to construct a nuclear device when shielding is used to obscure the neutron and gamma ray signatures. Unshielded Kg quantities of highly enriched uranium can be detected with high reliability with 1 minute counting times by detecting gamma rays from the 238U impurity. FIG. 1 of the accompanying drawings depicts example count data from a high resolution gamma ray detector used to detect Weapon grade uranium (WGU): 10% 238U 90% 235U without shielding and with 5 cm and 2.5 cm of lead shielding, respectively. FIG. 1 indicates how self-shielding of nuclear material reduces count rates. In order to shield a threat object, about 5 cm thick lead, gold, tungsten, or other shielding material is required. As indicated by FIG. 1, X-ray radiography can visualize objects, even in some dense, cluttered cargo, but definitive signatures of high z objects are confused by scatter backgrounds and transmission is insufficient for many cargos.

The particle detection systems and methods according to the disclosed technology can be implemented to generate artificially produced charged particles and detect presence of certain objects or materials such as nuclear materials. Tomographic information of such objects in various applications, which includes but not limited to inspecting packages, containers, occupied vehicles at security check points, border crossings and other locations for nuclear threat objects that may range from fully assembled nuclear weapons to small quantities of highly shielded nuclear materials.

In applications for portal monitoring, the illustrative implementations can be used to enable robust nuclear material detection at reduced cost and with increased effectiveness. Furthermore, the disclosed technology can provide a radiation portal monitor which is capable of determining whether a given vehicle or cargo is free of nuclear threats by both measuring the absence of a potential shielded package and the absence of a radiation signature.

Cosmic ray tomography is a technique which exploits the multiple Coulomb scattering of highly penetrating cosmic ray-produced muons to perform non-destructive inspection of the material without the use of artificial radiation. The Earth is continuously bombarded by energetic stable particles, mostly protons, coming from deep space. These particles interact with atoms in the upper atmosphere to produce showers of particles that include many short-lived pions which decay producing longer-lived muons. Muons interact with matter primarily through the Coulomb force having no nuclear interaction and radiating much less readily than electrons. They lose energy only slowly through electromagnetic interactions. Consequently, many of the cosmic ray-produced muons arrive at the Earth's surface as highly penetrating charged radiation. The muon flux at sea level is about 1 muon per cm2 per minute. The artificially produced charged particles used as the radiation source in the disclosed technology behave in a similar manner as the naturally occurring muons.

As a muon moves through material, Coulomb scattering off of the charges of sub-atomic particles perturb its trajectory. The total deflection depends on several material properties, but the dominant effect is the atomic number, Z, of nuclei. The trajectories are more strongly affected by materials that make good gamma ray shielding (such as lead and tungsten for example) and by special nuclear material (SNM), that is, uranium and plutonium, than by materials that make up more ordinary objects such as water, plastic, aluminum and steel. Each muon carries information about the objects that it has penetrated, and by measuring the scattering of multiple muons one can probe the properties of these objects. A material with a high atomic number Z and a high density can be detected and identified when the material is located, inside low-Z and medium-Z matter.

Coulomb scattering from atomic nuclei results in a very large number of small angle deflections of charged particles as the transit the matter. Enrico Fermi found and solved a transport equation that describes this process to a good approximation. The result is a correlated Gaussian distribution function for the displacement and angle change of the trajectory that depends on the density and the atomic charge of the material. The width of the distribution function is proportional to the inverse of the momentum of the particle and the square root of the real density of material measured in radiation lengths. Further background can be found in the reference of K. N Borozdin et al entitled "Surveillance: Radiographic Imaging with Cosmic Ray Muons", published in Nature (2003), 422, 277.

Cosmic ray-produced muons can provide information with no radiation dose above the earth's background and proper detection of such cosmic ray-produced muons can be implemented in a way that is especially sensitive to good shielding materials. A muon detection system can be configured to perform tomography of a target object under inspection based on scattering of muons by the target object. The system can be configured to perform tomography to localize scattering (RC & LS). The tomographic position resolution can be expressed approximately as follows:

$$\Delta x = \theta_{RMS} L \quad \text{Eq. 1.}$$

In Equation 1, $\theta_{RMS}$ is the root-mean-square (rms) of the scattering angle, and L is the size of the volume under the detection by the detection apparatus. For example, for an exemplary rms scattering angle of 0.02 radian and an apparatus size of 200 cm, the tomographic position resolution is 0.02×200 cm=4 cm.

In one approach, the angular resolution is determined by the following equation based on the Poisson statistics:

$$\frac{\Delta \theta}{\theta} = \frac{1}{\sqrt{2N}}. \quad \text{Eq. 2}$$

In Equation 2, θ is the rms scattering angle, and N is the number of cosmic ray-produced muons passing through a region of interest. For example, the angular resolution for N=100 (corresponding to a 10×10 cm² resolution element after one minute of counting) is Δθ=0.070.

Figure 2:
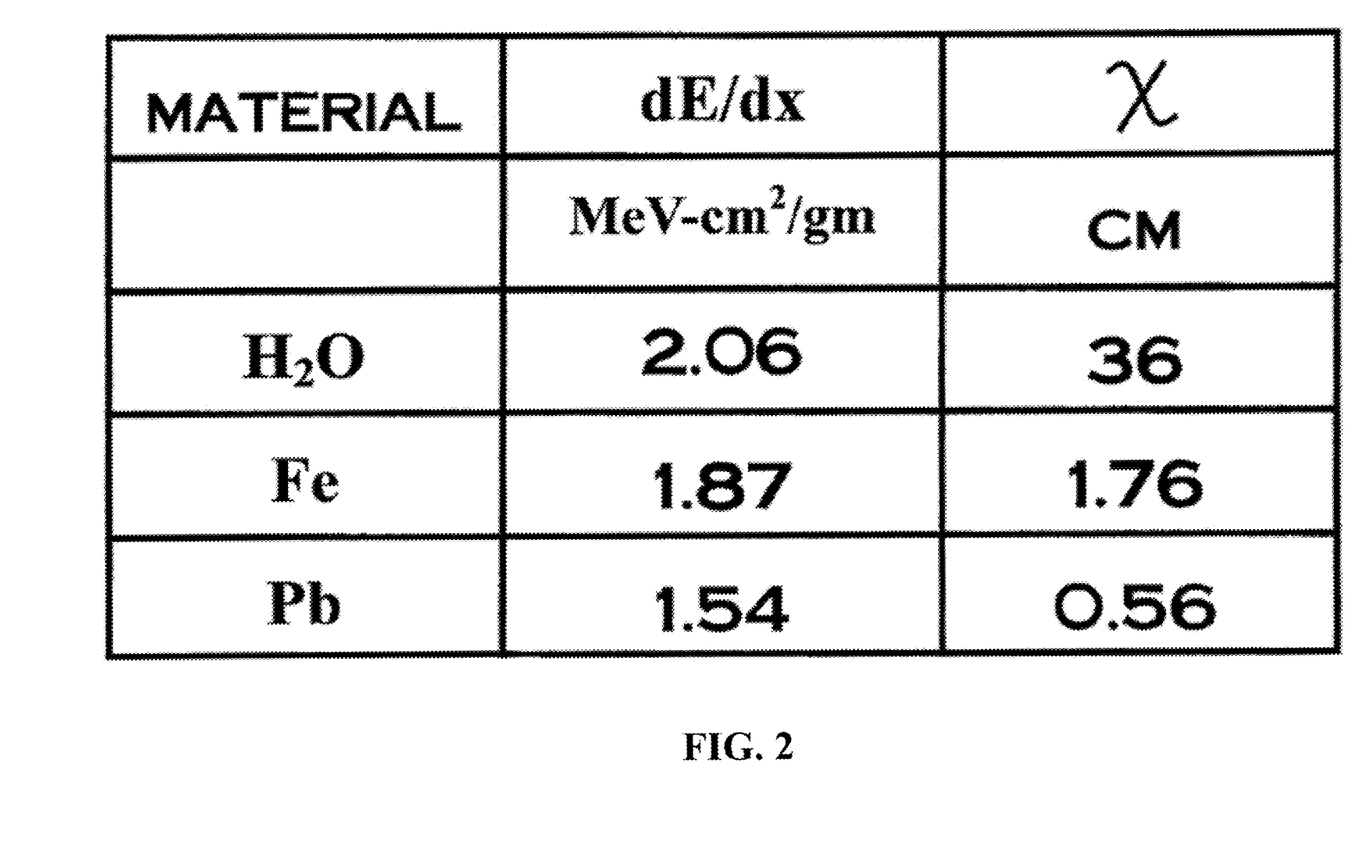
FIG. 2 depicts a table showing theoretical energy loss rate (dE/dx) and radiation length (X) for various material.

Referring to the table of FIG. 2, this table illustrates theoretical energy loss rate (dE/dx) and radiation length (X) for various materials. One minute of counting distinguishes a 10 cm cube of iron from a 10 cm cube of lead at 6 standard deviations on the basis of their different values of X.

Tomographic methods, designed to construct an image or model of an object from multiple projections taken from different directions, can be implemented in the cosmic ray system to provide a discrete tomographic reconstruction of the volume of interest based on the data provided by the muons. In some implementations, Monte Carlo simulation techniques can be used to study applications and shorten scanning times. Other stochastic processing methods including attenuation and scattering imaging algorithms may also be used in implementing the muon tomographic imaging provided by the disclosed technology.

Figure 3:
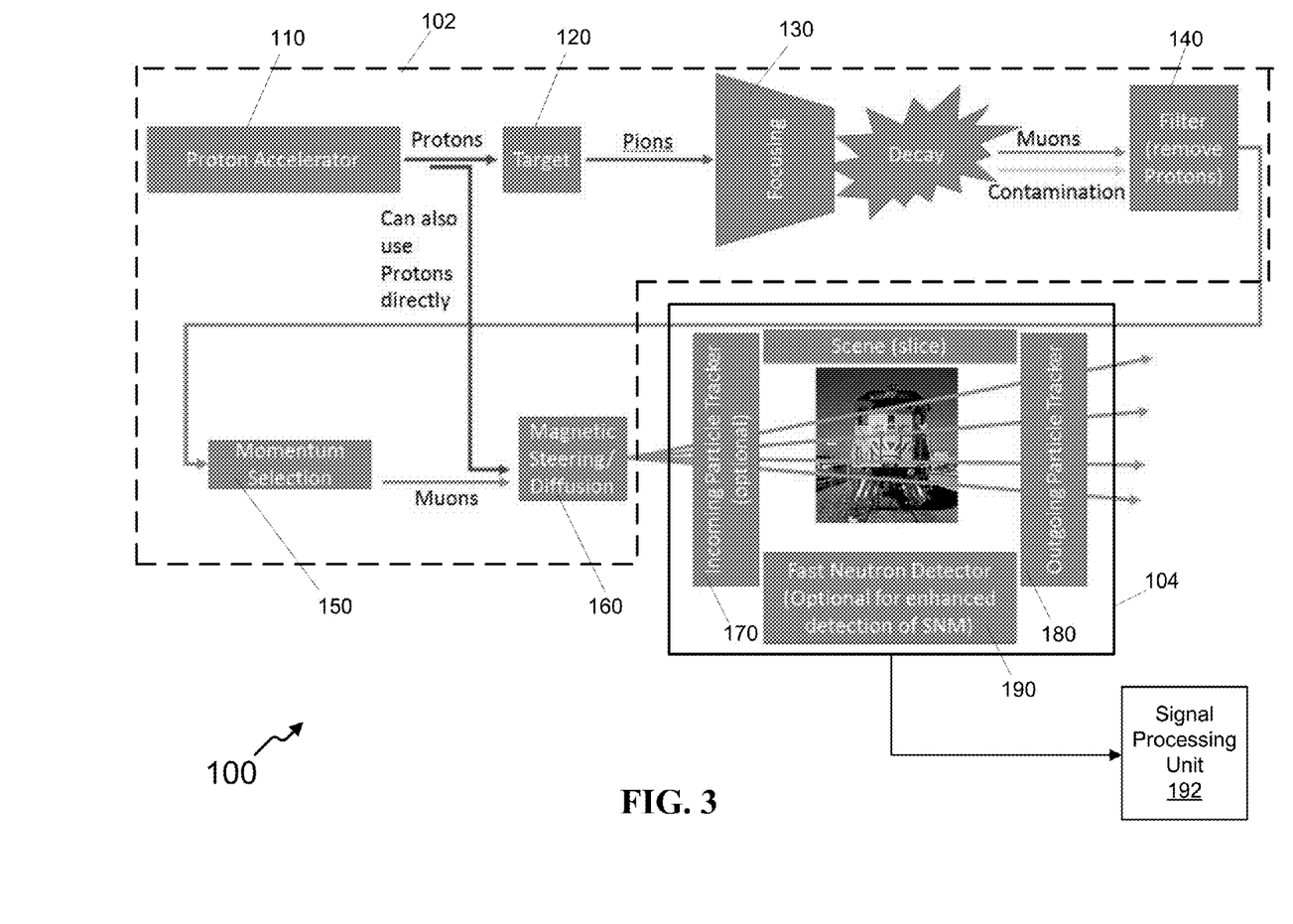
FIG. 3 illustrates a portal monitoring system using artificially produced charged particles.
Figure 4:
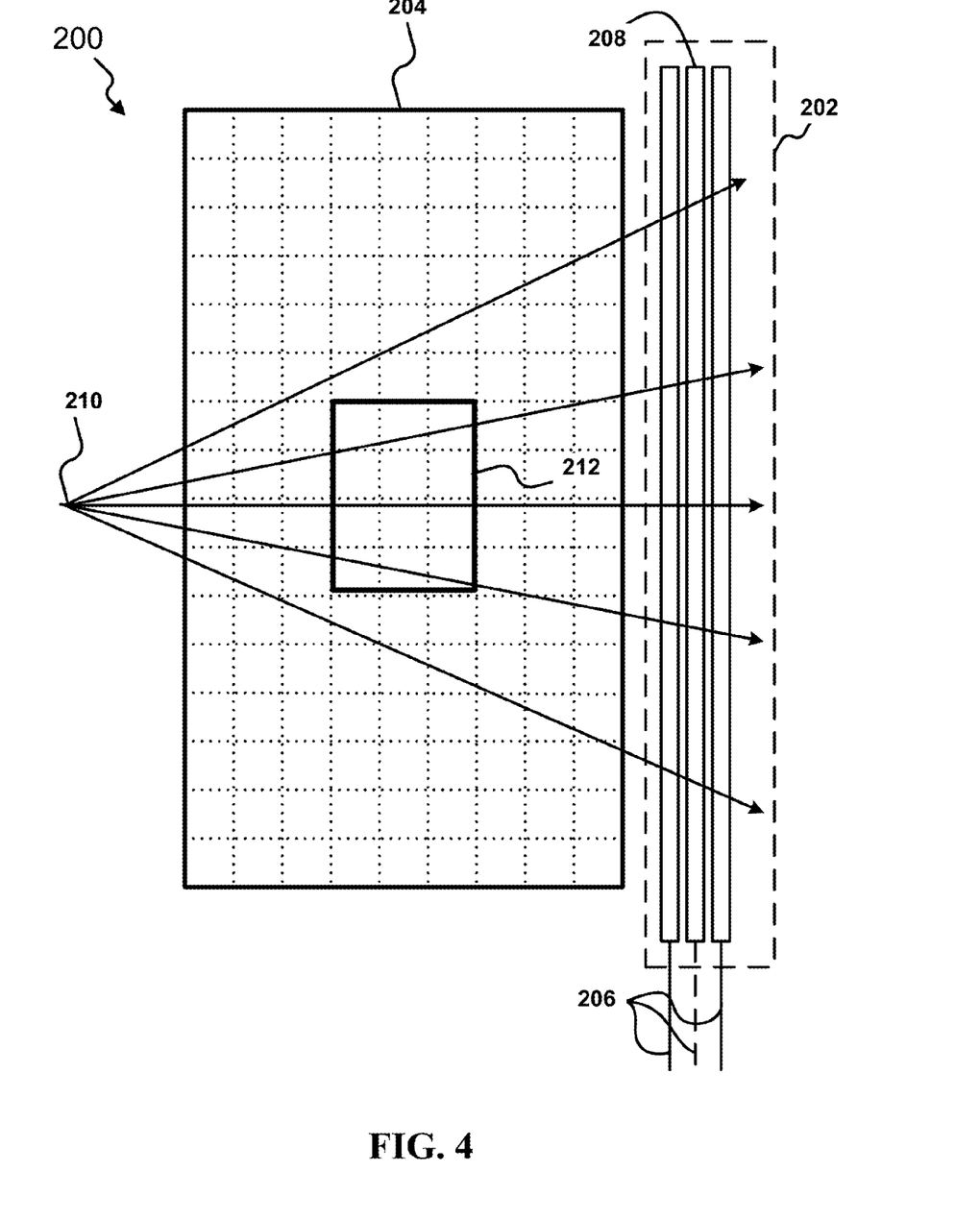
FIG. 4 illustrates a part of a portal monitoring system including a first set of position sensitive charged particles detectors.
Figure 5:
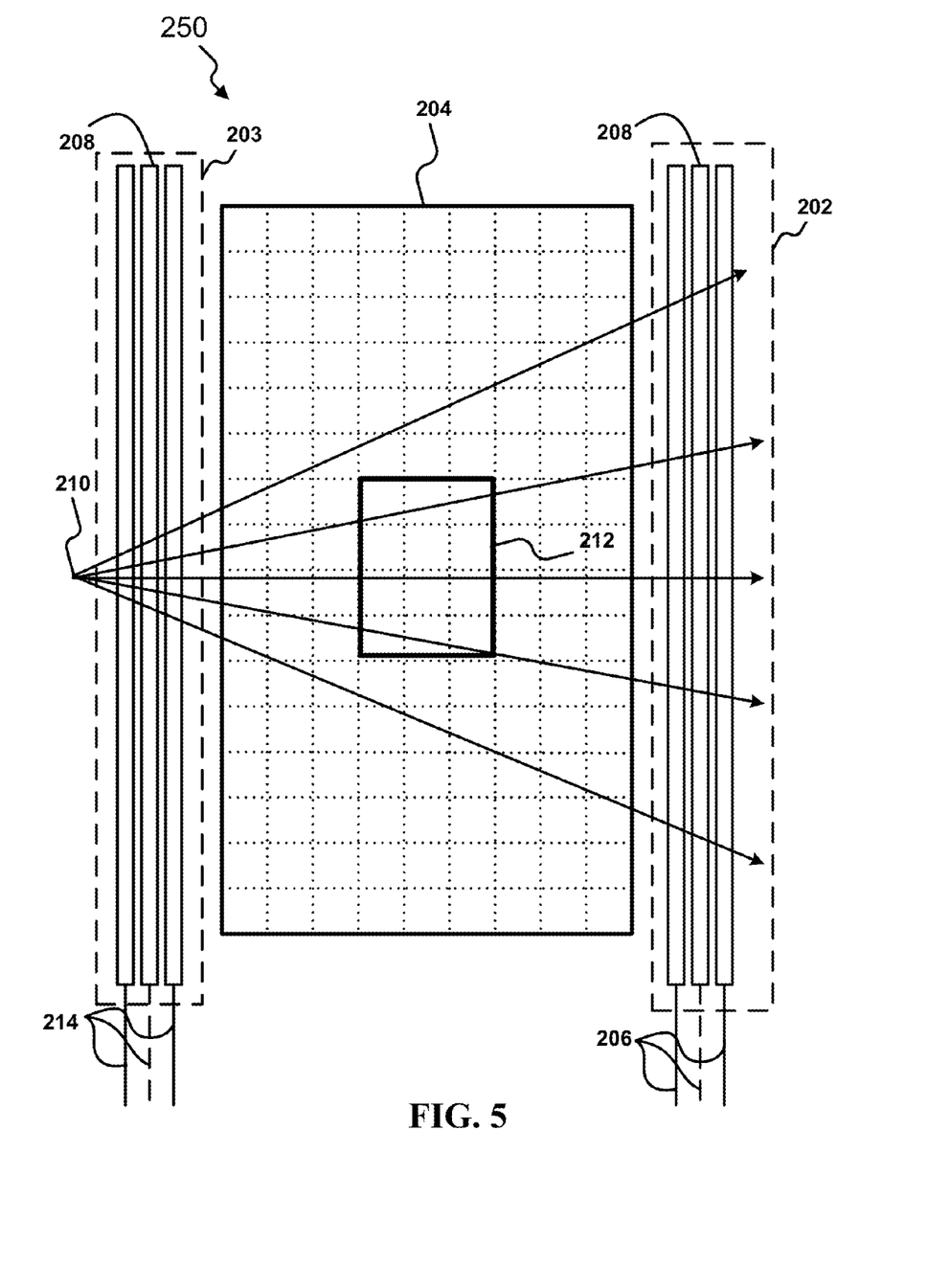
FIG. 5 illustrates a part of a portal monitoring system including first and second sets of position sensitive charged particles detectors.

The cosmic ray radiography function of the particle detection systems can be more readily understood with reference to examples of detection systems adapted to detect cosmic ray-produced charged particles such as those shown in FIGS. 3-5.

FIG. 3 illustrates an exemplary active radiation source portal monitoring system utilizing artificially produced cosmic rays including muons, protons, and neutrons.

An active radiation source portal monitoring system 100 includes a charged particle generation system 102 (identified by dashed line) and a tomographic imaging system 104. The charged particle generation system 102 includes structural components including hardware and associated software for artificially generating charged particles to be used as the active radiation source for the tomographic image system 104. The tomographic imaging system 104 includes structural components including charged particle detectors and associated software for tracking the artificially produced charged particles traversing through a scan volume to detect a target object in the scan volume.

The charged particle generation system 102 includes a particle accelerator 110 that generates accelerated particles such as accelerated protons with high energy that produce pions, which decays into charged particles. Examples of the particle accelerator 110 that generates accelerated protons can include a laser plasma wakefield accelerator, an radio frequency (RF) accelerator, or other similarly capable particle accelerators. The particle accelerator 110 can generate accelerated protons with high energy, such as in the range from approximately 590 to 3000 megaelectron volt (MeV). The accelerated protons are transmitted toward a target 120 to produce the pions that decay as muons as a result of nuclear interaction between the accelerated proton and the target nuclei. The target 120 includes materials, such as a graphite plate to cause atomic nucleus to produce pions from the accelerated protons generated by the particle accelerator 110. To maintain a desired transmission of the accelerated protons, the target 120 can include a collimation system that includes one or more collimators structured to prevent or reduce loss of the accelerated protons due to scattering. For example, the collimation system can include angled cones with inner and outer radius suitable for intercepting scattering protons at a predetermined angles in the milliradiance range. A beamline unit 130 of the charged particle generation system 102 focuses the produced pions and provides a mechanism for the pions to decay into charged particles, for example, muons. The beamline unit 130 can include focusing magnets to capture and focus the produced pions and directs the captured and focused pions to a decay drift section to allow the pions to decay into muons. The charged particle generation system 102 can include a filter unit 140 coupled to the beamline unit 130 to remove protons that remains after the charged particles, e.g., muons, are produced. Examples of the filter unit 140 may include polyethylene or other low-Z material with similar proton filtering function or capability.

The charged particle generation system 102 includes a selection unit 150 to select charged particles having specific values of momentum in order to ensure desired performance of the tomographic imaging system 104. The selection unit 150 can include dipole magnets coupled to the filter 140 and/or the decay drift section of the beamline unit 130 and tuned to select charged particles, such as muons with a momentum value in a desired range, for example 500 to 1500 MeV. The charged particle generation system 102 includes a charged particles control unit 160 to control the charged particles to enter into the scan volume including the target object in a desired manner. The scan volume may have a sufficient size to have an entire scene of vehicle or cargo container occupying the scan volume. The charged particles control unit 160 records information including the position and angles (i.e., directions in the 3-D space) of charged particles to be supplied to the scan volume. For example, a magnetic steering mechanism, such as one or more dipole steering magnets can be integrated into a quadrupole magnet to provide a steering of the muon beam (e.g., 1-dimensional) raster on scan volume. Further, the charged particles control unit 160 diffuses the charged particles into the volume by creating a fan beam of muons.

In some implementations, the particle accelerator 110 can transmit the accelerated particles, e.g., accelerated protons directly to the charged particles control unit 160 to steer and diffuse the accelerated protons into the scan volume. In addition to or in combination with muons, protons can be used as the source of active radiation for the tomographic imaging system 104.

The tomographic imaging system 104 includes an outgoing particle tracker 180 for tracking charged particles (e.g., muons) generated by the charged particle generator 102 that traverse and exit the scan volume after interacting with the target object in the scan volume. In some implementations, the tomographic imaging system 104 can include an optional incoming particle tracker 170 to track the charged particles generated by the charged particle generator 102 that enter the scan volume. Including the incoming particle tracker 170 can improve tracking of the charged particle by detecting entry of the charged particles in addition to the exit of the charged particles.

To further enhance detection and identification of the target object in the scan volume as special nuclear material (SNM), such as uranium and plutonium, the tomographic imaging system can include a fast neutron detector 190 in some implementations. Neutron detectors (e.g., 3He and scintillation) can detect and discriminate materials that undergo muon-induced fission, such as low-enriched uranium (LEU). In some implementations, a laser or photogrammetry scanning technique may be used to perform scene position tracking for the scan volume.

FIG. 4 illustrates an exemplary tomographic imaging system 200 for detection of a target object in an active radiation source portal monitoring system. The tomographic imaging system 200 is one implementation of the tomographic imaging system 104 that includes an outgoing particle tracker 202 without the optional incoming particle tracker or the optional neutron tracker. The outgoing particle tracker 202 is arranged at an exit side of a scan volume 204 to detect outgoing particles, such as muons which have passed through the scan volume 204. The outgoing particle tracker 202 includes a set of two or more planes 206 of position-sensitive particle (e.g., muon) detectors 208 to record information on the outgoing muon particles. The muon detectors 208 can measure the position and angles (i.e., directions in the 3-D space) of outgoing muon tracks 210 with respect to two different directions, e.g., in two orthogonal coordinates along x and y axes. Muons pass through the volume 204 where the target object 212 may be located and are scattered to an extent dependent upon the material of the target object 201 occupying the volume through which particles pass.

The position-sensitive muon detectors 208 can be implemented using drift tubes. A drift tube is a sealed ionization chamber with a coaxial transmission line filled with a mixture of low-pressure gases. The sealed ionization chamber of a drift tube can be implemented as a hollow cylinder (e.g., 2 inch-diameter aluminum tubes) that is filled with gas and sealed. The aluminum wall of the drift tube acts as a cathode. A fine gold plated tungsten-rhenium wire element is strung down the long axis of the tube to act as an anode. The drift tube produces electrical signals in response to ionization radiation that passes into or through its volume. The drift tube combines three functions into a single device: sensing, timing and gain.

The gas in the drift tube is ionized by incidence of muons that creates electron-ion pairs. For gamma rays, electrons are produced when the gamma ray is incident on the aluminum shell of the drift tube that then ionizes the gas in the drift tube. Since a high-potential difference is maintained between the anode and the cathode (nominally 2.9 kV), the electrons thus created drift towards the anode and collide with other molecules along the way, with the positively charged ions moving towards the cathode. The electrons then reach the anode, producing a measureable current in the anode wire. The time that elapses between the muon incidence on the drift tube and the measured signal in the anode wire is known as the drift time. The further the muon trajectory is from the anode, the longer the drift time. The gas itself consist of a mixture of helium (4He), ethane, tetrafluoromethane, and argon, chosen to ensure performance and to sustain the large electrical fields inside the drift tube without breakdown.

In order to inspect a large volume, the drift tubes in the outgoing particle tracker 202 can be arranged to operate as pairs with each pair representing a channel. The pairs of drift tubes and corresponding signal channels can be organized hierarchically into a composite unit called a module. In addition, the modules can be organized into groups of Super Modules (SM).

FIG. 5 illustrates another exemplary tomographic imaging system 250 for detection of an object in an active radiation source portal monitoring system. The tomographic imaging system is one implementation of the tomographic imaging system 104 which includes an incoming particle tracker 203 in addition to an outgoing particle tracker 202. The outgoing particle tracker 202 is substantially similar to the one shown and described with respect to FIG. 4. For the incoming particle tracker 203, another set of two or more planes 214 of position-sensitive muon detectors 208 are arranged at an incident side of the scan volume 204. The position-sensitive muon detectors 208 at the incoming particle tracker 203 can track muon particles entering and passing through the scan volume 204 and the target object 212 to provide the position and angles (i.e., directions in the 3-D space) of incoming muon tracks 210. The position-sensitive muon detectors 208 in the incoming particle detector 203 can be implemented as drift tubes, similar to the outgoing particle detector 202. In some implementations, the drift tubes in the incoming particle detector 202 and the outgoing particle detector 203 can be arranged to allow at least three charged particle positional measurements in a first direction and at least three charged particle positional measurements in a second direction which is different from the first direction and may be orthogonal to the first direction. Additional particle detectors above and below the scan volume 204 (not shown) may be used to detect more vertically orientated muon tracks from either naturally occurring cosmic rays, additional actively generated muons, or scattering muons exiting through the top and bottom of the scan volume 204. The scattering angle of each muon is computed from the incoming and outgoing measurements.

In some implementations, the incoming particle tracker 203 may be sized to have a width corresponding to the width of the fan beam. Because the outgoing tracker 202 is designed to detect scattered muons, the outgoing tracker 202 may be sized to be wider than that of the incoming tracker 203. The tomographic imaging system (e.g., tomographic imaging system 200 or 250) may be used to detect the target object 212 included in a conveyance or a transport vehicle, for example, a car, a train, etc., in motion. For scanning objects in motion, the incoming and outgoing particle trackers 202 and 203 respectively can handle high muon rates, for example, 150,000 muons/cm2/second.

In some implementations, the active radiation source portal monitoring system 100 can scan slices of the conveyance in motion and the slices can be assembled into 3-D dataset for the entire conveyance. In this regard, algorithms developed for cosmic-ray scanning may apply to obtaining 3-D dataset for the entire conveyance.

Referring to FIGS. 3, 4 and 5, a signal processing unit 192, e.g., a computer, is provided in the active radiation source portal monitoring system 100 as a part of the tomographic imaging system 104 or as a separate component to process signals received from the incoming and outgoing particle trackers 202 and 203. The signal processing unit 192 can receive data signals associated with the outgoing muons measured or detected by the position-sensitive muon detectors 208 of the outgoing particle tracker 202, and when available, data signals associated with the incoming muons measured or detected by the position-sensitive muon detectors 208 of the incoming particle tracker 203. When the active radiation source portal monitoring system 100 does not include incoming particle tracker, the signal processing unit 192 can receive information on the incoming muons from the charged particles control unit 160. The signal processing unit 192 can analyze from the received data signals, scattering of the muons in the scan volume 212 based on the measured incoming (if available) and outgoing positions and directions of muons to obtain a tomographic profile or the spatial distribution of the scattering density reflecting the scattering strength or radiation length within the volume 204. The obtained tomographic profile or the spatial distribution of the scattering density within the volume 204 can reveal the presence or absence of the target object 212 in the volume 204.

FIGS. 4 and 5 show position sensitive drift tube detectors 208 of the incoming and outgoing particle trackers 203 and 202 positioned at locations near the scan volume 204 where the charged particles enter and exit the scan volume 204. In some implementations, additional position sensitive drift tube detectors can be implemented to be positioned near the top and bottom of the scan volume 204 to form a box or four sided structure into which a package, a vehicle or cargo container can enter for scanning by the active radiation source portal monitoring system 100. The top and bottom positioned drift tube detectors can be used to detect naturally occurring charged particles entering and exiting the scan volume 204 and/or the actively produced charged particles that scatter from the interaction with the target object 212 and exit through the top or bottom of the scan volume 204.

The processing of measurements for actively produced muons in a volume under inspection (e.g., a vehicle) by the processing unit 192 for the active radiation source portal monitoring system 100 in FIGS. 3, 4 and 5, and other systems described in this patent document can include reconstructing the trajectory of a charged particle such as a muon through the volume 204, measuring the momentum of an incoming muon based on signals received from the position-sensitive particle detectors 208 of the incoming particle tracker 203, measuring the momentum of an outgoing muon based on signals from the position-sensitive particle detectors 208 of the outgoing particle tracker 202, and determining the spatial distribution of the scattering density of the scan volume 204. These and other processing results can be used to construct the tomographic profile and measure various properties of the scan volume 204.

In some implementations, the reconstruction of the trajectory of a charged particle passing through a position-sensitive detector having a set of drift cells can include: (a) obtaining hit signals representing identifiers of drift cells hit by charged particles and corresponding hit times; (b) grouping in-time drift cell hits identified as being associated with a track of a particular charged particle passing through said detector; (c) initially estimating a time zero value for a moment of time at which said particular charged particle hits a drift cell; (d) determining drift radii based on estimates of the time zero values, drift time conversion data and the time of the hit; (e) fitting linear tracks to drift radii corresponding to a particular time zero value; and (f) searching and selecting a time-zero value associated with the best of the track fits performed for a particular charged particle and computing error in time-zero and tracking parameter. Such reconstruction of the track based on the time zero fit provides a reconstructed linear trajectory of the charged particle passing through the position-sensitive charged particle detector without having to use fast detectors (such as photomultiplier tubes with scintillator paddles) or some other fast detector which detects the passage of the muon through the apparatus to the nearest few nanoseconds to provide the time-zero.

In some implementations, the processing for measuring the momentum of an incoming or outgoing muon based on signals from the position-sensitive charged particle detectors can include, for example, (a) configuring position sensitive detectors to scatter a charged particle passing through the position sensitive detectors; (b) measuring the scattering of a charged particle in the position sensitive detectors including obtaining at least three positional measurements of the scattering charged particle; (c) determining at least one trajectory of the charged particle from the positional measurements; and (d) determining at least one momentum measurement of the charged particle from the at least one trajectory. This technique can be used to determine the momentum of the charged particle based on the trajectory of the charged particle which is determined from the scattering of the charged particle in the position sensitive detectors themselves without the use of additional metal plates in the detector.

In some implementations, the spatial distribution of the scattering density of the volume can be determined from charged particle tomographic data by: (a) obtaining predetermined charged particle tomography data corresponding to scattering angles and estimated momentum of charged particles passing through the scan volume; (b) providing the probability distribution of charged particle scattering for use in an expectation maximization (ML/EM) algorithm, the probability distribution being based on a statistical multiple scattering model; (c) determining substantially maximum likelihood estimate of object volume density using the expectation maximization (ML/EM) algorithm; and (d) outputting reconstructed object volume scattering density. The reconstructed scan volume scattering density can be used to identify the presence and/or type of a target object occupying the volume of interest from the reconstructed volume density profile. Various applications include cosmic ray-produced muon tomography for various homeland security inspection applications in which vehicles or cargo can be scanned by a muon tracker.

In some implementations, the active radiation source portal monitoring system 100 may employ position sensitive detectors to configure an incoming particle tracker, an outgoing particle tracker, or both incoming and outgoing particle trackers. Each set of position sensitive detectors in an incoming or outgoing particle tracker can include a first double-layer of drift tubes arranged in the X direction and a second double-layer of drift tubes arranged in the Y direction. The relevant descriptions of the arrangement of the double-layers of drift tubes in the X and Y directions are disclosed in U.S. Pat. No. 8,247,767, the contents of which are incorporated herein by reference.

The tomographic processing part of the signal processing unit 192 may be implemented in a computer at the same location as the position-sensitive particle detectors 208. Alternatively, the tomographic processing part of the signal processing unit 192 may be implemented in a remote computer that is connected on a computer network such as a private network or a public network such as the Internet.

Figure 6:
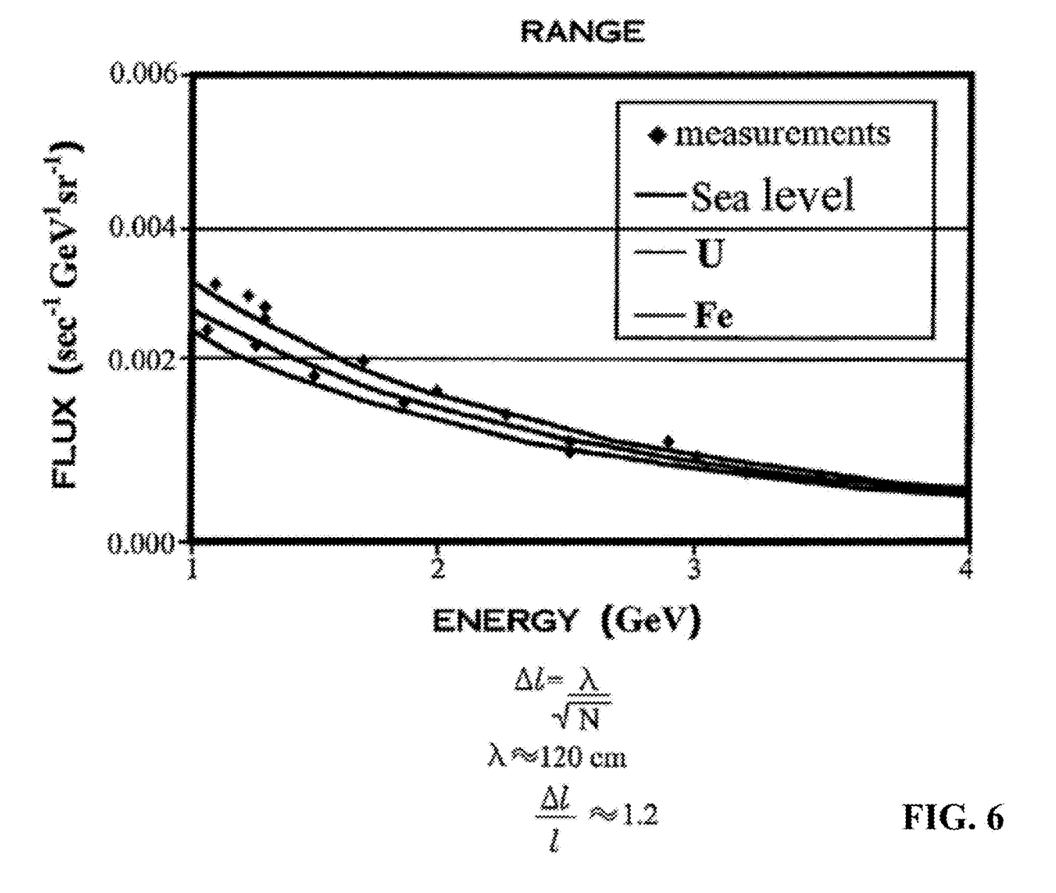
FIGS. 6 and 7 respectively illustrate typical experimental range data and multiple coulomb scattering theoretical results of measuring 1000 cm2 of uranium for 1 minute with a cosmic ray system.
Figure 7:
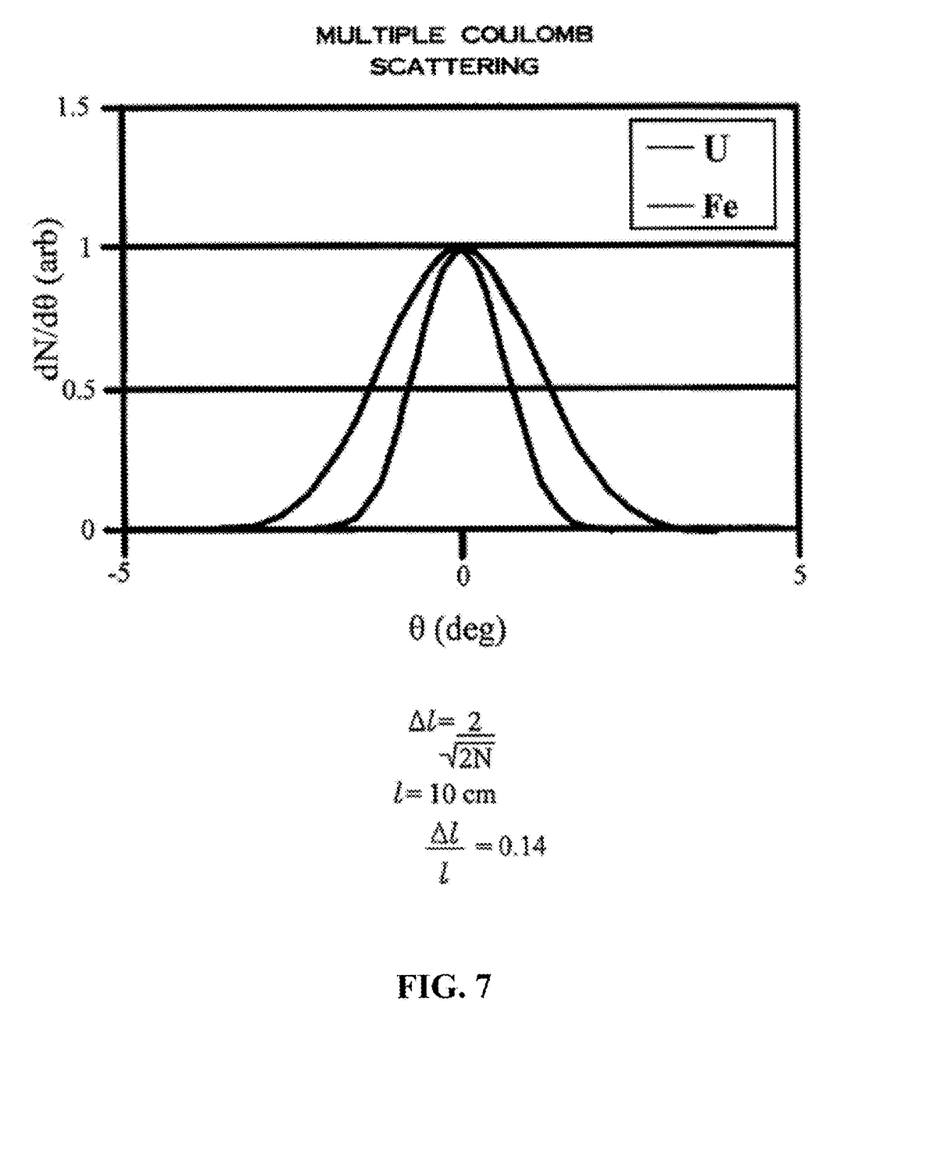

FIGS. 6 and 7 respectively illustrate exemplary experimental range data and multiple Coulomb scattering theoretical results of measuring 1000 $cm^3$ of uranium for 1 minute with a cosmic ray-produced muon detection system. The data and results shown and described with respect to FIGS. 6 and 7 demonstrate that charged particle (muon) tomography is much more sensitive than the range radiography previously employed in searches for hidden chambers in an Egyptian pyramid and measurement of geological overburden.

Figure 8:
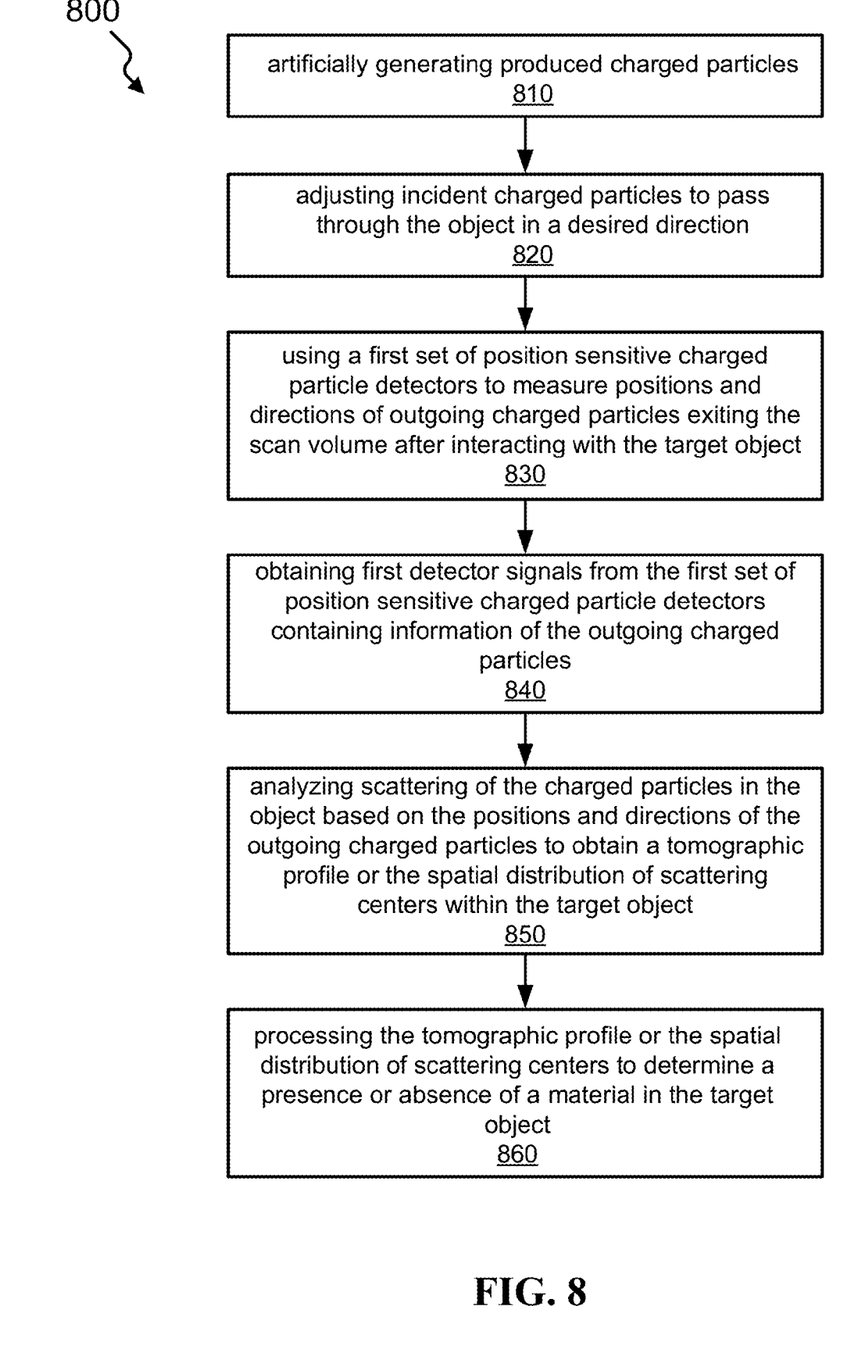
FIG. 8 illustrate a flowchart operating a particle detection system (such as a portal monitoring system) of FIG. 3.

FIG. 8 shows a process flow diagram of an exemplary method 800 performed by an active radiation source portal monitoring system (such as an active radiation source portal monitoring system 100 of FIG. 5). The method 1000 includes artificially generating produced charged particles as incident charged particles that are used to detect an object (810); adjusting incident charged particles to pass through the object in a desired direction to facilitate the detection (820); using a first set of position sensitive charged particle detectors located on a first location of the scan volume containing the target object to measure positions and directions of outgoing charged particles exiting the scan volume after interacting with the target object (830); obtaining first detector signals from the first set of position sensitive charged particle detectors containing information of the outgoing charged particles (840); analyzing scattering of the charged particles in the target object contained within the scan volume based on the positions and directions of the outgoing charged particles to obtain a tomographic profile or the spatial distribution of scattering centers within the target object (850); and processing the tomographic profile or the spatial distribution of scattering centers to determine a presence or absence of a material in the target object (860).

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

In some embodiments, various methods or processes (e.g., data or signal processing operations) may be implemented a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present document include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document.

What is claimed is:

1. An active radiation source portal monitoring system comprising:
    a particle accelerator as a source of charged particles;
    a target unit that receives the charged particles including protons, wherein a nuclear interaction between the protons and atomic nucleus of the target unit produces other particles including pions;
    a beamline unit to allow the produced pions to decay into muons;
    a selection unit to select the muons having specific values of momentum;
    a charged particles control unit to control the charged particles, including the muons, to enter into a volume to be scanned in a desired direction to interact with an object located in the volume;
    a particle tracking unit arranged at a location near the volume to detect the charged particles exiting the volume after interacting with the object and generate signals indicative of information on the charged particles exiting the volume; and
    a signal processing unit communicatively coupled to the particle tracking unit, the signal processing unit to receive the generated signals and to analyze scattering of the charged particles, including the muons, in one or more materials included in the object based on the received signals indicative of the information on the charged particles exiting the volume to obtain a tomographic profile or a spatial distribution of scattering centers within the object.

2. The system of claim 1, wherein the particle tracking unit includes a set of position sensitive charged particles detectors positioned at a location with respect to the volume to measure positions and directions of the charged particles exiting from the volume.

3. The system of claim 2, comprising another particle tracking unit positioned at a location near the volume to detect the charged particles entering the volume;
    wherein the another particle tracking unit includes another set of position sensitive charged particle detectors to measure positions and directions of the charged particles entering the volume towards the object.

4. The system of claim 2, further comprising a fast-neutron detector positioned to detect neutrons induced by the charged particles.

5. The system of claim 1, wherein the charged particles control unit is configured to supply the charged particles provided by the particle accelerator directly to the volume.

6. The system of claim 1, further comprising a filter to remove at least some of the protons that remain after the pions decay into muons.

7. The system of claim 1, wherein the specific values of momentum include values between 500 MeV and 1500 MeV.

8. The system of claim 2, wherein the signal processing unit is configured to reconstruct a trajectory of the charged particles entering the volume and interacting with the object, measure a momentum of the charged particles exiting the volume after interacting with the object based on signals from the first set of position sensitive charged particle detectors, and obtain a spatial distribution of a scattering density of the object holding volume.

9. The system of claim 2, wherein the signal processing unit is configured to:
   determine a spatial distribution of a scattering density of the object to obtain predetermined charged particle tomography data corresponding to scattering angles and estimated momentum of the charged particles passing through the volume and interacting with the object;
   provide a probability distribution of charged particle scattering for use in an expectation maximization algorithm based on a statistical multiple scattering model; and
   determine a substantially maximum likelihood estimate of the scattering density of the object using the expectation maximization algorithm.

10. The system of claim 2, wherein the sets of position sensitive charged particle detectors of the particle tracking units include multiple layers to reconstruct both the position and angle of the charged particle.

11. A method for sensing a presence or absence of a material in a target object, comprising:
   artificially generating charged particles as incident charged particles that are used to detect an object in a scan volume of a charged particle tomographic system, wherein the artificially generating of the charged particles comprises:
      generating accelerated protons;
      directing the generated accelerated protons toward a target to produce pions;
      decaying the produced pions into muons that are supplied as the incident charged particles, wherein the incident charged particles includes the generated accelerated protons; and
      selecting the muons having specific values of momentum;
   adjusting the incident charged particles, including the muons, to pass through the scan volume in a desired direction to interact with the object in the scan volume;
   detecting at a set of position sensitive charged particle detectors located on a side of the scan volume to measure positions and directions of the charged particles exiting the scan volume after interacting with the object;
   obtaining detector signals from the set of position sensitive charged particle detectors containing information of the charged particles exiting the scan volume;
   analyzing scattering of the charged particles, including the muons, in the object based on the positions and directions of the charged particles exiting the scan volume to obtain a tomographic profile or a spatial distribution of scattering centers within the object; and
   processing the tomographic profile or the spatial distribution of scattering centers to determine a presence or absence of a target material in the object.

12. The method of claim 11, further comprising:
   detecting at a second set of position sensitive charged particle detectors located on another side near the scan volume containing the object to measure positions and directions of the incident charged particles entering the scan volume and traversing towards the object; and
   obtaining detector signals containing information of the incident charged particles entering the scan volume from the set of position sensitive charged particle detectors located on the another side near the scan volume containing the object to measure positions and directions of the incident charged particles entering the scan volume,
   wherein the analyzing includes using the positions and directions of the incident charged particles entering the scan volume to obtain the tomographic profile or the spatial distribution of scattering centers within the object.

13. The method of claim 11, further comprising:
   detecting with a fast-neutron sensitive detector located near the scan volume emission of neutrons from the volume, wherein the analyzing includes discriminating fissionable materials in the object.

14. The method of claim 11, further comprising:
   utilizing information on the incident charged particles that are determined during the adjusting operation as information of the incident charged particles entering the scan volume,
   wherein the analyzing includes using the positions and directions of the incoming charged particles obtained from the adjusting to obtain the tomographic profile or the spatial distribution of scattering centers within the object.

15. The method of claim 11, wherein the analyzing scattering of the charged particles in the object includes obtaining an angle and momentum of each charged particle passing through the object to provide a probability distribution of charged particle scattering.

16. The method as in claim 11, further comprising determining a type of the target material present in the object.

17. The method as in claim 16, wherein the determining the type of the target material is based at least partly on atomic numbers of the target material.

18. The method of claim 11, further comprising removing at least some protons that remain after the charged particles are produced.

19. An active radiation source portal monitoring system comprising:
   a particle accelerator as a source of charged particles;
   a target unit that receives the charged particles including protons, wherein a nuclear interaction between the protons and atomic nucleus of the target unit produces other particles including pions;
   a beamline unit to allow the produced pions to decay into muons;

a selection unit to select the muons having specific values of momentum;

a charged particles control unit to control the charged particles, including the muons, to enter into a volume that is configured to contain an object of interest;

a particle tracking unit arranged to detect the charged particles exiting the volume upon interaction with the object of interest and to generate signals indicative of information on the charged particles exiting the volume; and a signal processing unit communicatively coupled to the particle tracking unit, the signal processing unit to receive the generated signals and to analyze scattering of the charged particles, including the muons, based on the received signals indicative of the information on the charged particles exiting the volume to obtain a tomographic profile or a spatial distribution of scattering centers within the object of interest.

* * * * *